3,272,801
STEROIDAL SPIRO-OXAZOLIDINONES
David J. Marshall, Hampstead, and Clara Revesz, Montreal, Quebec, Canada, assignors to American Home Products Corporation, New York, N.Y., a corporation of Delaware
No Drawing. Filed Nov. 19, 1964, Ser. No. 412,303
14 Claims. (Cl. 260—239.55)

It has been found that 17α-aminomethyl-17β-hydroxysteroids react with phosgene in the presence of bases to form spiro-oxazolidin-2-ones, a novel class of steroid derivatives. In a subsequent step, the oxazolidinones may be N-alkylated by treatment with alkyl halides in the presence of strong bases. These reactions may be represented as follows:

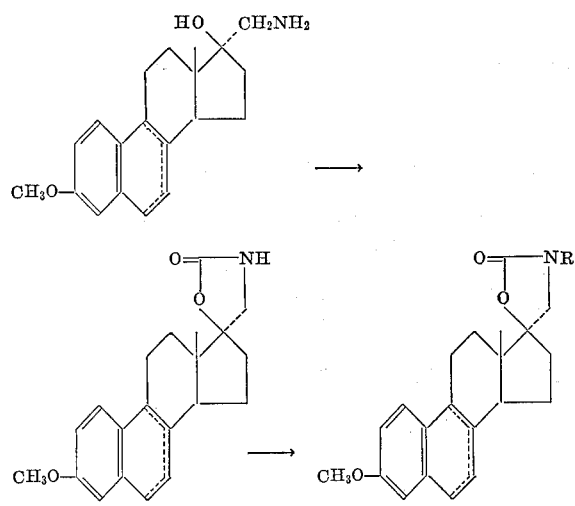

In the formulae, the dotted lines indicate that there may be additional double bonds present in ring B, e.g. $C^7$—$C^8$ or $C^6$—$C^7$ and $C^8$—$C^9$.

Thus, the known 17α-aminomethylestradiol 3-methyl ether (Birch and Harrisson, Austral J. Chem., 8,519 (1955)), on reaction with phosgene in the presence of aqueous potassium hydroxide, gave spiro [3-methoxy-1,3,5(10) - estratrien]-17-5'-oxazolidin-2'-one. Similarly, 17α-aminomethyl-1,3,5(10), 7-estratetraene-3,17-diol 3-methyl ether and 17α-aminomethyl-1,3,5(10),6,10-estrapentaene-3,17-diol 3-methyl ether, which are new compounds, on reaction with phosgene give the corresponding spiro-oxazolidin-2'-ones. The base required to react with the hydrogen chloride which is liberated during the reaction may be either an organic base such as pyridine, or aqueous sodium or potassium hydroxide. An inert solvent is necessary for the steroid. This may be a cyclic ether such as tetrahydrofuran.

The two aminoalcohols mentioned above which are new compounds may be prepared from equilin methyl ether and equilenin methyl ether respectively, by the same procedure used (loc. cit.) for the corresponding estrone derivative, namely formation of the 17α-cyano-17β-acetoxy derivative and reduction of the latter with lithium aluminum hydride. These reactions may be represented as follows:

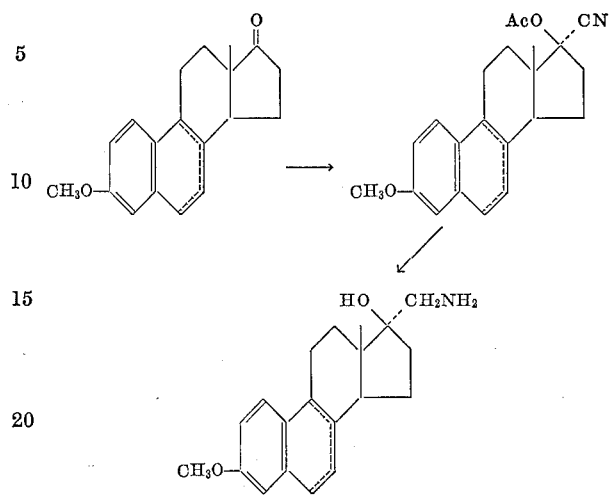

Ac represents acetyl.

The N-alkylation of the oxazolidinones was carried out by forming the sodio derivative by reaction with sodium hydride in an inert hydrocarbon solvent, followed by reaction of the sodio derivative with lower alkyl halides.

The above oxazolidinones are antigonadotrophic compounds with very little estrogenic activity and may be used for the control of pregnancy.

The following examples illustrate my invention.

EXAMPLE 1

*17α-aminomethyl-1,3,5(10),7-estratetraene-3,17-diol 3-methyl ether*

A mixture of 21.0 g. of equilin mehtyl ehter and 420 ml. of dioxane was stirred and warmed to about 40° until the steroid dissolved. Without further heating, 84 g. of potassium cyanide was added, and then a mixture of 84 ml. of acetic acid and 126 ml. of ethanol was added dropwise over a period of 15 minutes. The mixture was allowed to stand for one hour, and then 840 ml. of water was added with ice-cooling. The precipitated solid was filtered, dissolve in ether, and the ether solution was washed with water, dried and evaporated. The residue was acetylated at room temperature for 65 hours with 172 ml. of pyridine and 86 ml. of acetic anhydride. The crude product obtained by pouring into ice-water was crystallized from methanol, yielding 17α-cyano-1,3,5(10),7-estratetraene-3,17-diol 3-methyl ether 17-acetate, M.P. 141–145°.

A solution of 6.0 g. of the cyanoacetate in 80 ml. of benzene and 80 ml. of ether was added over a period of 30 minutes to 3.0 g. of lithium aluminum hydride in 90 ml. ether cooled in an ice bath. Stirring was continued for one hour longer at room temperature, and the mixture was then heated under reflux for 1.5 hour. Excess hydride was decomposed by the slow addition of 5 ml. of ethyl acetate to the cooled mixture and then 17 ml. of saturated sodium potassium tartrate was added dropwise, and the mixture was filtered. The filter cake, which contained all of the desired product adsorbed on it, was extracted overnight with tetrahydrofuran in a Soxhlet apparatus. Concentration to a small volume and filtration then yielded 17α-aminomethyl-1,3,5(10),7-estratetraene-3,17-diol 3-methyl ether.

EXAMPLE 2

*17α-aminomethyl-1,3,5(10),6,8-estrapentaene-3,17-diol 3-methyl ether*

This compound is prepared from equilenin methyl ether in a manner exactly analogous to that described above for the corresponding estratetraene derivative.

EXAMPLE 3

*Spiro[3-methoxy-1,3,5(10)-estratrien]-17,5'-oxazolidin-2'-one*

To a suspension of 6.4 g. of 17α-aminomethylestradiol methyl ether in 224 ml. of tetrahydrofuran was added a solution of potassium hydroxide in 192 ml. of water. The mixture was stirred vigorously in an ice bath and 81.4 g. of a 12 percent solution of phosgene in benzene was added over a period of 10 minutes. Stirring was continued for one hour, and the organic phase was then separated and concentrated to a small volume. The residue was dissolved in methylene chloride and the solution was washed with water, dried and concentrated. Crystallization from methylene chloride methanol gave the oxazolidinone, M.P. 272–277° (dec), $[\alpha]_D \pm 0°$ (chf.), $\nu_{max}$ 1750 cm.$^{-1}$.

*Analysis.*—Calcd. for $C_{21}H_{27}NO_3$: C, 73.87; H, 7.97; N, 4.10. Found: C, 73.81; H, 8.10; N, 4.37.

EXAMPLE 4

*Spiro[3-methoxy-1,3,5(10),7-estratetraen]-17,5'-oxazolidin-2'-one*

This compound was prepared by allowing 17α-aminomethyl-1,3,5(10),7-estratetraene-3,17-diol 3-methyl ether to react with phosgene in the presence of aqueous potassium hydroxide in a manner exactly analogous to that used for the corresponding estratriene derivative. The product was crystallized from methylene chloride-methanol and had M.P. 238–244° (dec), $[\alpha]_D + 157°$ (chf.).

*Analysis.*—Calcd. for $C_{21}H_{25}NO_3$: C, 74.31; H, 7.42; N, 4.13. Found: C, 74.20; H, 7.56; N, 4.27.

EXAMPLE 5

*Spiro[3-methoxy-1,3,5(10),6,8-estrapentaen]-17,5'-oxazolidin-2'-one*

This compound is prepared by the method described above for the corresponding estratriene derivative from 17α - aminomethyl-1,3,5(10),6,8-estrapentaene-3,17-diol 3-methyl ether and phosgene.

EXAMPLE 6

*Spiro[3-methoxy-1,3,5(10)-estratrien]-17,5'-[3'-methyloxazolidin-2'-one]*

A mixture of 0.70 g. of a 53.5 percent dispersion of sodium hydride in mineral oil and 2.50 g. of spiro[3-methoxy-1,3,5(10)-estratrien] - 17,5' - oxazolidin-2'-one in 125 ml. of dry benzene was stirred and refluxed for one hour. Methyl iodide (25 ml.) was then added and heating was continued for 24 hours. After cooling, 10 ml. of absolute ethanol was added, followed by water, and the mixture was extracted with benzene. Crystallization from acetone-hexane gave the N-methyl derivative M.P. 158–160°, $[\alpha]_D -8.6°$ (chf.).

*Analysis.*—Calcd. for $C_{22}H_{29}NO_3$: C, 74.33; H, 8.22; N, 3.94. Found: C, 74.06; H, 8.42; N, 3.86.

When ethyl bromide, propyl bromide, or butyl bromide are substituted for methyl iodide in the above procedure, the corresponding 3'-ethyl, propyl and butyl derivatives are obtained.

Similarly, spiro[3 - methoxy-1,3,5(10),7-estratetraen]-17,5'-oxazolidin-2'-one and spiro[3-methoxy-1,3,5(10),6,8-estrapentaen]-17,5'-oxazolidin-2'-one are converted to their 3'-lower alkyl derivatives by the same procedure.

We claim:

1. Compounds of the formula

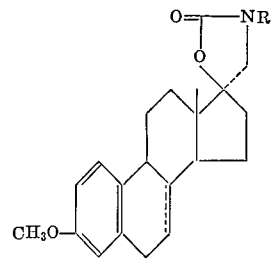

where R is selected from the group consisting of hydrogen and lower alkyl.

2. Compounds of the formula

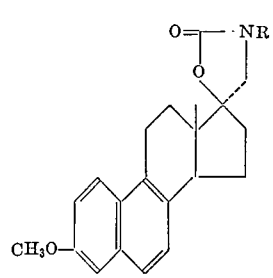

where R is selected from the group consisting of hydrogen and lower alkyl.

3. Spiro[3 - methoxy - 1,3,5(10) - estratrien] - 17,5'-oxazolidin-2'-one.

4. Spiro[3methoxy - 1,3,5(10),7 - estratetraen]-17,5'-oxazolidin-2'-one.

5. Spiro[3-methoxy - 1,3,5(10),6,8 - estrapentaen]-17,5'-oxazolidin-2'-one.

6. Spiro[3-methoxy - 1,3,5(10) - estratriene]-17,5'-[3'-methyloxazolidin-2'-one].

7. Spiro[3 - methoxy - 1,3,5(10),7 - estratetraene]-17,5'-[3'-methyloxazolidin-2'-one].

8. Spiro[3 - methoxy - 1,3,5(10),6,8 - estrapentaene]-17,5'-[3'-methyloxazolidin-2'-one].

9. The process which comprises treating 17α-aminomethylestradiol 3-methyl ether with phosgene in the presence of an aqueous base, thereby obtaining spiro[3-methoxy-1,3,5(10)-estratrien]-17,5'-oxazolidin-2'-one.

10. The process which comprises treating 17α-aminomethyl-1,3,5(10),7-estratraene-3,17-diol 3-methyl ether with phosgene in the presence of an aqueous base, thereby obtaining spiro[3-methoxy-1,3,5(10),7-estratetraen]-17,5'-oxazolidin-2'-one.

11. The process which comprises treating 17α-aminomethyl-1,3,5(10),6,8-estrapentaene - 3,17 - diol 3-methyl ether with phosgene in the presence of an aqueous base, whereby obtaining spiro[3-methoxy-1,3,5(10),6,8-estrapentaen]-17,5'-oxazolidin-2'-one.

12. The process for the N-alkylation of spiro[3-methoxy - 1,3,5(10)-estratrien]-17,5'-oxazolidin-2'-one which comprises treating said compound with sodium hydride in an inert hydrocarbon solvent, thereby obtaining the corresponding sodio derivative, and then treating said sodio derivative with a lower alkyl halide, thereby obtaining the 3'-lower alkyl derivative of said starting material.

13. The process for the N-alkylation of spiro[3-methoxy - 1,3,5(10),7 - estratetraen]-17,5'-oxazolidin-2'-one which comprises treating said compound with sodium hydride in an inert hydrocarbon solvent, thereby obtaining the corresponding sodio derivative, and then treating said sodio derivative with a lower alkyl halide, thereby obtaining the 3'-lower alkyl derivative of said starting material.

14. The process for the N-alkylation of spiro[3-methoxy - 1,3,5(10),6,8-estrapentaen]-17,5′-oxazolidin-2′-one which comprises treating said compound with sodium hydride in an inert hydrocarbon solvent, thereby obtaining the corresponding sodio derivative, and then treating said sodio derative with a lower alkyl halid, thereby obtaining the 3′-lower alkyl derivative of said starting material.

No references cited.

LEWIS GOTTS, *Primary Examiner.*

HENRY A. FRENCH, *Assistant Examiner.*